(12) United States Patent
Sikorski

(10) Patent No.: US 12,731,447 B2
(45) Date of Patent: Sep. 8, 2026

(54) PROPORTIONAL RELIEF SYSTEM FOR A POWER TAKE-OFF

(71) Applicant: ION ENGINEERED FLUID POWER SYSTEMS LLC, Barberton, OH (US)

(72) Inventor: Robert James Sikorski, New Franklin, OH (US)

(73) Assignee: ION ENGINEERING FLUID POWER SYSTEMS LLC, Barberton, OH (US)

( * ) Notice: Subject to any disclaimer, the term of this patent is extended or adjusted under 35 U.S.C. 154(b) by 0 days.

(21) Appl. No.: 19/196,296

(22) Filed: May 1, 2025

(65) Prior Publication Data

US 2025/0342735 A1 Nov. 6, 2025

Related U.S. Application Data

(60) Provisional application No. 63/641,470, filed on May 2, 2024.

(51) Int. Cl.

| | |
|---|---|
| ***G07C 5/08*** | (2006.01) |
| ***B60K 25/02*** | (2006.01) |
| ***B60R 16/023*** | (2006.01) |
| ***F15B 13/02*** | (2006.01) |
| ***F15B 19/00*** | (2006.01) |
| ***G05D 16/20*** | (2006.01) |
| ***G06K 7/10*** | (2006.01) |
| *B62D 53/08* | (2006.01) |

(52) U.S. Cl.

CPC ............ *G07C 5/0816* (2013.01); *B60K 25/02* (2013.01); *B60R 16/0231* (2013.01); *F15B 13/024* (2013.01); *F15B 19/00* (2013.01); *G05D 16/2022* (2019.01); *G06K 7/10366* (2013.01); *B60K 2025/026* (2013.01); *B62D 53/08* (2013.01)

(58) Field of Classification Search

CPC .................. G07C 5/0816; B60K 25/02; B60K 2025/026; B60R 16/0231; F15B 19/00; F15B 13/024; G05D 16/2022; G06K 7/10366; B62D 53/08

USPC ......................................... 701/101, 103, 110

See application file for complete search history.

(56) References Cited

U.S. PATENT DOCUMENTS 10,363,934 B2 * 7/2019 Ornella ................. F16H 61/438
11,713,806 B2 * 8/2023 Meid ........................ F15B 13/02 60/413
2016/0047397 A1 * 2/2016 Sikorski .................... F15B 1/04 60/416

* cited by examiner

*Primary Examiner* — Hai H Huynh
(74) *Attorney, Agent, or Firm* — Renner, Otto, Boisselle & Sklar, LLP

(57) ABSTRACT

A proportional relief manifold system for a power take-off device includes a proportional relief solenoid valve. A pressure transducer is mechanically coupled to the proportional relief solenoid valve and is configured to measure an actual fluid pressure. Controller circuitry is in electrical communication with the pressure transducer and the proportional relief solenoid valve. The controller circuitry receives a desired fluid pressure and receives from the pressure transducer the measured actual fluid pressure. The controller circuitry determines a pressure difference between the received actual fluid pressure and the received desired fluid pressure and determines a pressure operating parameter based on the determined pressure difference. The controller circuitry modulates the actual fluid pressure by outputting the pressure operating parameter to the proportional relief solenoid valve to modify the actual fluid pressure to match the desired fluid pressure.

19 Claims, 8 Drawing Sheets

600
122
602
106
108
220
202
138
410
404
208
218
212
410
400
402
210
222
408
406
216
102

PROPORTIONAL RELIEF SYSTEM FOR A POWER TAKE-OFF

This application is a Secondary and claims priority of U.S. of America Application No. 63/641,470, filed May 2, 2024, which is incorporated herein by reference in its entirety.

TECHNICAL FIELD

The present disclosure relates to power take-off systems providing fluid power to trailers of tractor trailer vehicles, and more particularly, power take-off systems configured to adjust an actual fluid pressure value developed by a tractor-mounted power take-off system to accommodate operating requirements of fluid power-driven equipment located on multiple trailers that may be selectively connected to the tractor.

SUMMARY

Tractor portions of tractor trailer vehicles include one or more power generation units such as an engine (e.g., an internal combustion engine). The engine supplies rotational power to at least one wheel of the tractor to drive or move the tractor trailer. The engine can also be used to supply operational power to vehicle subsystems, such as a dump system or a walking floor, located on the trailer.

Tractor trailers can use power take-off devices to direct power developed by the engine located on the tractor to an attached trailer. The power (e.g., fluid power) can be used to provide operational power for one or more trailer subsystems located on the trailer. The power take-off device helps reduce the need for tractor trailers to support and operate a second power generation unit for the trailer subsystems. In some particular examples, the power generation unit is an internal combustion engine providing a rotational power output.

The rotational power output from the engine is often used as an input to a vehicle transmission to provide rotational power to a tractor drive train component. In turn, the transmission can direct drive train power through a power take-off device which can then direct rotational mechanical power to a pump. The pump selectively increases pressure and flow rate within a fluid power system (e.g., a hydraulic power system) to transfer fluid power to the trailer to operate one or more trailer subsystems. For example, trailers can include hydraulically operated dump systems, walking floors, screw-feed material handling systems, etc.

However, each tractor can be selectively connected to a variety of different trailers that include a variety of different hydraulically powered trailer subsystems. Each trailer and its trailer subsystem may have differing fluid power pressure and flow rate requirements for proper operation in comparison to any other trailer. Often, a tractor trailer operator will fail to adjust fluid power system components to adjust for different trailer equipment fluid power requirements. For example, a tractor trailer operator might forget or refuse to adjust a system relief valve and rely upon altering the engine revolutions per minute (rpm) to adjust pump flow requirements for the individual trailer that is connected to the tractor.

Tractor trailer vehicle processes of dump lifting, operating walking floors, operating screw-feed material handling systems, etc. often include power provision tasks. These power provision tasks could be made more efficient by providing automated fluid power regulation such that the fluid power provided to the trailer and the trailer subsystem more closely matches a desired fluid pressure tailored to each particular trailer. Automated fluid power regulation can help the tractor trailer operator properly operate a relatively wide range of trailer subsystems with minimal intervention.

According to an aspect of the present disclosure, a proportional relief manifold system for a power take-off device includes a proportional relief solenoid valve. The proportional relief solenoid valve includes a spool and defines an inlet port and an outlet port. Both the inlet port and the outlet port are configured to be in fluid communication with a fluid power line. The inlet port is located on an upstream side of the spool, and the outlet port is located on a downstream side of the spool. The proportional relief manifold system also includes a pressure transducer mechanically coupled to the proportional relief solenoid valve. The pressure transducer is configured to measure an actual fluid pressure on the upstream side of the spool. The proportional relief manifold system further includes controller circuitry in electrical communication with the pressure transducer and the proportional relief solenoid valve. The controller circuitry is configured to receive a desired fluid pressure and receive from the pressure transducer the measured actual fluid pressure. The controller circuitry is also configured to determine a pressure difference between the received actual fluid pressure and the received desired fluid pressure and determine a pressure operating parameter based on the determined pressure difference. The controller circuitry is further configured to modulate the actual fluid pressure by outputting the pressure operating parameter to the proportional relief solenoid valve. The proportional relief solenoid valve modifies the actual fluid pressure of the fluid to match the desired fluid pressure.

According to another aspect of the present disclosure, an electronic control system for a power take-off system operating a unit of equipment located on a vehicle trailer includes an engine control device including at least one of an electronic control unit, an electronic throttle input, an electronic engine input, or an electro-mechanical device. The electronic control system also includes controller circuitry in electrical communication with the engine control device. The controller circuitry is configured to receive a desired fluid pressure to operate the unit of equipment. The controller circuitry is also configured to determine an engine operating parameter based on the desired fluid pressure. The controller circuitry is further configured to output the engine operating parameter to the engine control device. The engine control device modifies an engine parameter to match the desired fluid pressure to operate the unit of equipment.

According to another aspect of the present disclosure, an electronic control system for a power take-off system operating a unit of equipment located on a vehicle trailer includes controller circuitry. The controller circuitry is configured to receive a plurality of desired power take-off operating parameters associated with a plurality of units of equipment selectively operated by the fluid. The controller circuitry includes a memory configured to store the plurality of desired power take-off operating parameters associated with the plurality of units of equipment. The controller circuitry is configured to receive an equipment operating status from an operation sensor. The controller circuitry is also configured to compare the equipment operating status to a desired power take-off operating parameter of the plurality of desired power take-off operating parameters stored in the memory. The controller circuitry is further configured to determine a power take-off operating parameter based upon the comparison of the equipment operating status to the desired power take-off operating parameter. The controller circuitry is configured to output the power take-off operating parameter to a power take-off device. The power take-off device is at least one of engaged or disengaged by altering a connection of the power take-off device to a powertrain of a vehicle.

The following description and the annexed drawings set forth certain illustrative embodiments of the disclosure. These embodiments are indicative, however, of but a few of the various ways in which the principles of the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of a proportional relief manifold system and an electronic control system for a power take-off system and their use.

DETAILED DESCRIPTION

Figure 1:
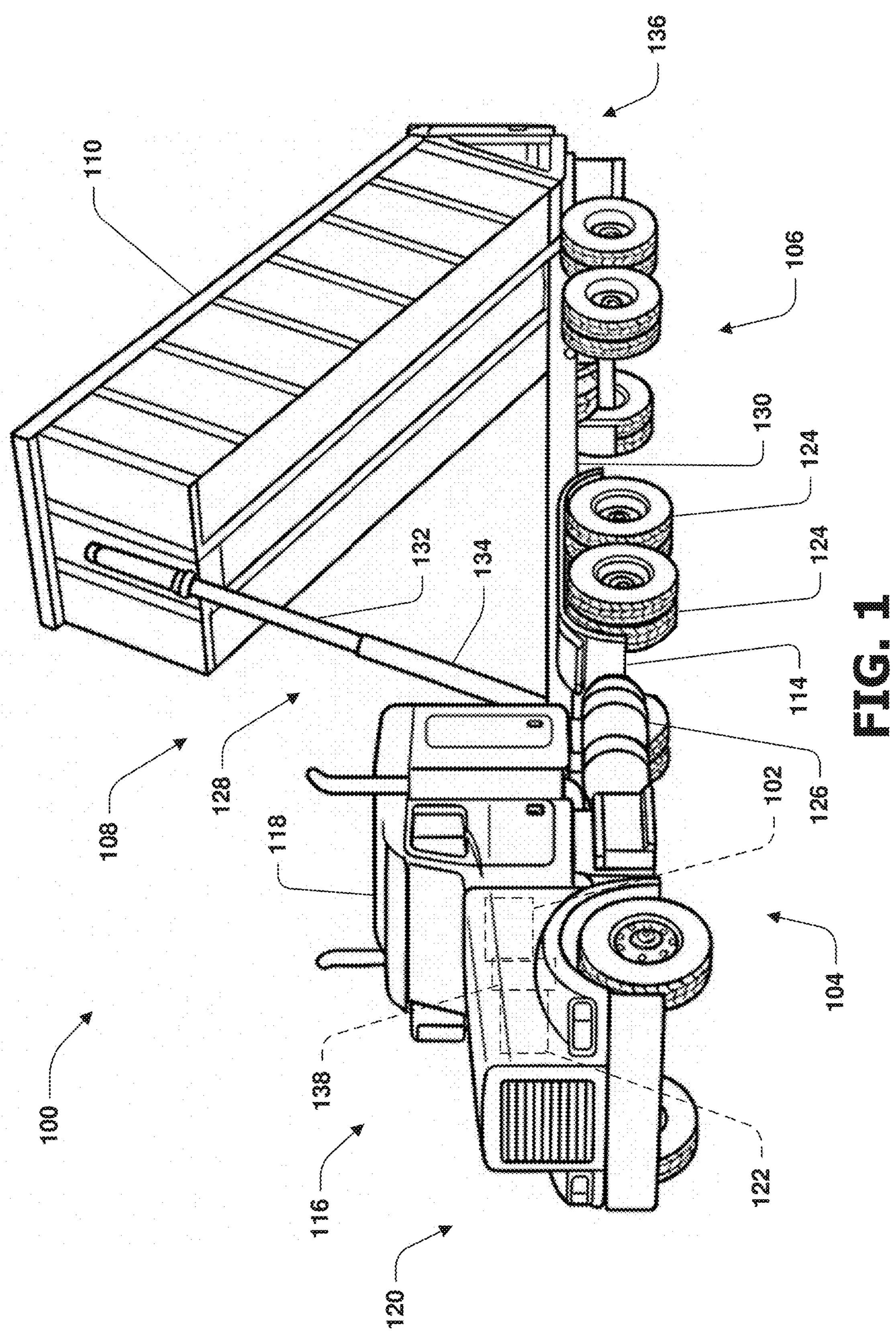
FIG. 1 is a perspective view of an exemplary tractor trailer including a trailer subsystem.

While the described apparatus and methods can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended.

The present disclosure is directed to control systems for power take-off devices associated with a tractor trailer vehicle. More specifically, the control systems help control pressure and volume of fluid power delivered to subsystems located on a trailer of the tractor trailer vehicle. A disclosed proportional relief manifold system is configured to provide an electrical signal to a proportional control valve to control an actual fluid pressure of a hydraulic fluid provided to the trailer subsystem. A disclosed electronic control system provides an engine operating parameter to an engine control device. The engine control device modifies an engine parameter based upon a desired fluid pressure. A disclosed electronic control system provides a power take-off operating parameter to a power take-off device. The power take-off device is at least one of engaged or disengaged by altering a connection of the power take-off device to a powertrain of a vehicle based upon the desired fluid pressure.

Referring initially to FIG. 1, a tractor trailer vehicle 100 and an exemplary proportional relief manifold system 102 for a power take-off device is illustrated. In this embodiment, the tractor trailer 100 is depicted as a combination of a tractor 104 portion and a trailer 106 portion. While the trailer 106 is illustrated as including a trailer subsystem 108 including a hydraulically-operated dump bed 110, any suitable trailer 106 that utilizes fluid power systems can be used with the devices and methods of the present disclosure. Such trailers 106 can include, but are not limited to, trailers having a dump structure, a walking floor, a screw drive material handling device, etc.

The tractor 104 includes a chassis 112, shown as a truck frame 114, and a body assembly 116 coupled to the truck frame 114. The body assembly 116 defines a cab 118. The cab 118 is coupled to a front end 120 of the truck frame 114 and includes various components to facilitate operation of the tractor trailer 100 by an operator (e.g., a seat, a steering wheel, hydraulic controls, etc.). The cab 118 can also include components that can execute commands automatically to control various vehicle subsystems within the tractor 104 or located on the trailer 106 (e.g., computers, controllers, processing units, etc.). The tractor trailer 100 further includes a prime mover 122 coupled to the truck frame 114 at a position in front of the cab 118 or at any other suitable location.

The prime mover 122 provides power to a plurality of motive members, shown as wheels 124, and to other subsystems of the vehicle (e.g., a pneumatic system, a hydraulic system, etc.). In some examples, the prime mover 122 is an internal combustion engine 122 attached to the truck frame 114. The engine 122 may consume fuel from at least one on-board fuel tank 126 to provide power to the motive members and various subsystems of the tractor trailer 100.

As shown in FIG. 1, the tractor trailer 100 can be a dump-type hauling vehicle 100 including the trailer subsystem 108, namely, the hydraulically-operated dump bed 110, that includes a hydraulic cylinder 128 coupled to a trailer frame 130 and the dump bed 110. The hydraulic cylinder 128 may be rotatably coupled to the trailer 106. with a pivot (e.g., a lug, a shaft, etc.). During operation of the dump bed 110, the hydraulic cylinder is provided with hydraulic power on a lower side of a piston within the hydraulic cylinder 128. Application of the hydraulic power tends to extend a piston rod 132 away from a body 134 of the hydraulic cylinder. Extension of the piston rod 132 tends to rotate the dump bed 110 about an axis toward a rear side 136 of the trailer 106. This dump truck-style system is described for illustrative purposes of an exemplary trailer subsystem 108 only, and any suitable trailer subsystem 108 can be used with the devices and methods of the present disclosure. Various other types of trailer subsystems for tractor trailers are also contemplated.

Fluid power systems (e.g., the trailer subsystem 108) located on tractor trailers often collect rotational power developed in the engine 122 to operate the trailer subsystem 108. Often, a power take-off device (PTO) 138 collects rotational power developed in the engine 122 and transfers the collected rotational power from the drivetrain of the tractor 104 to another application (e.g., the trailer subsystem 108). A suitable PTO 138 may include a flywheel PTO attached to the engine 122, a transmission PTO attached to a transmission of the tractor 104, a full-power PTO attached to a drive train component between the engine 122 and the transmission of the tractor 104, or any other suitable PTO.

Selection criteria of the PTO type can include the amount of rotational power required to operate the various trailer subsystems 108, whether the tractor trailer 100 is stopped or moving during operation of the trailer subsystems 108, necessary torque capacity of the PTO, the PTO operating speed, etc.

Figure 2:
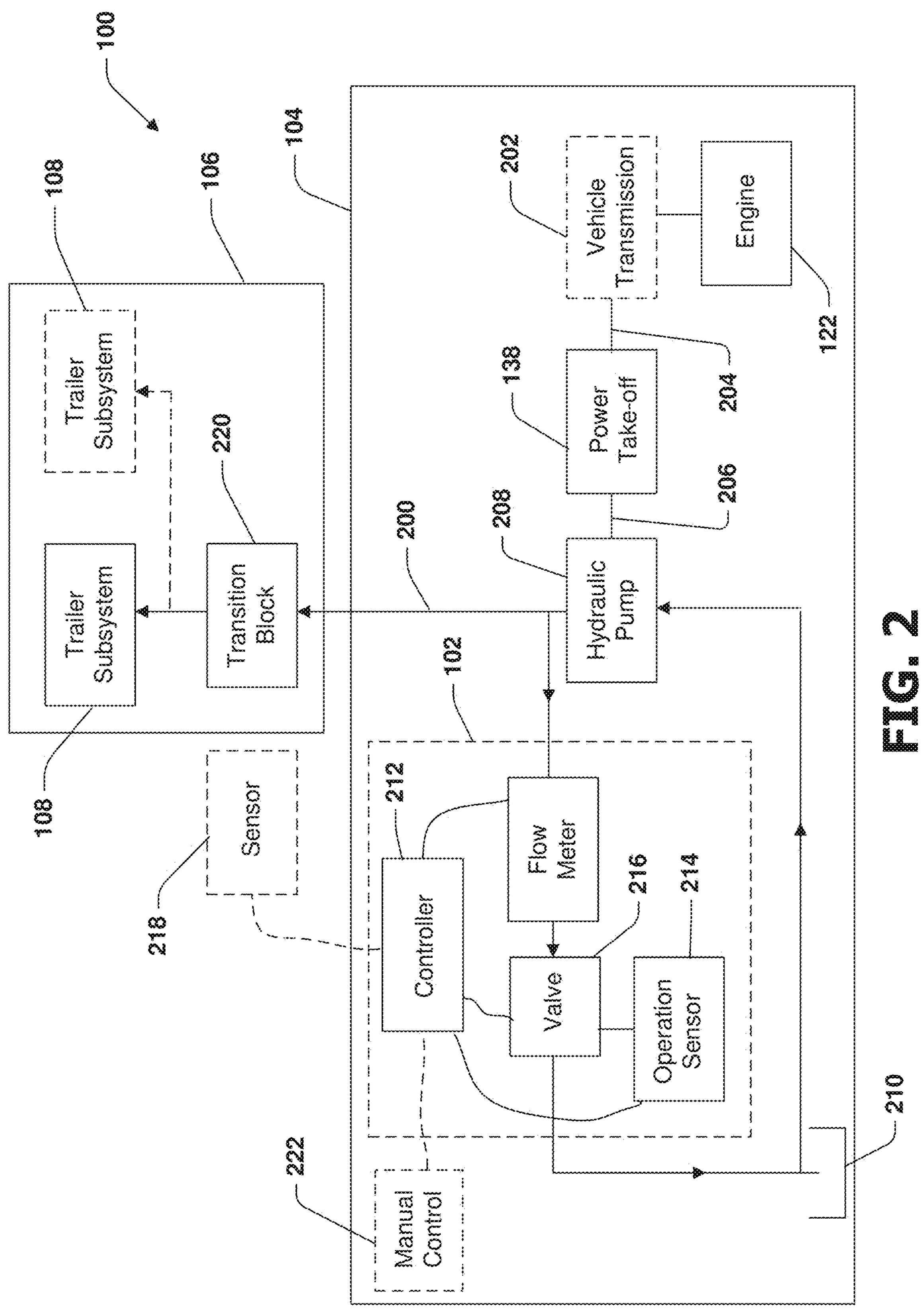
FIG. 2 is a schematic representation of an exemplary proportional relief manifold system for a power take-off device of the tractor trailer of FIG. 1.

Referring to FIG. 2, a schematic representation of an exemplary proportional relief manifold system 102 for the tractor trailer 100 is illustrated. The proportional relief manifold system 102 is configured to modulate or control an actual fluid pressure within a fluid pressure supply line 200 that provides fluid pressure to the trailer 106. The fluid pressure transmitted to the trailer 106 enables fluid pressure operation of one or more trailer subsystems 108. The tractor 104 can be designed and constructed to be agnostic with regard to the type of trailer 106 and the type of trailer subsystem 108 located on the trailer 106. In other words, overall efficiency of tractor 104 usage can benefit from increased ability to connect to and operate several types of trailers 106 that include several types of trailer subsystems 108. FIG. 2 schematically represents both the tractor 104 and the trailer 106 as rectangular shapes.

However, various types of trailer subsystems 108 have differing fluid power operating requirements from one another such as fluid pressure, fluid flow rates, etc. For example, the dump-type hauling trailer shown in FIG. 1 may require a different fluid pressure than a walking floor hauling trailer. The proportional relief manifold system 102 described herein can help ensure that the tractor 104 provides a desired fluid pressure through the fluid pressure supply line 200 to the trailer subsystem 108. In some examples, the proportional relief manifold system 102 described herein can help ensure that the tractor 104 provides a desired fluid pressure through the fluid pressure supply line 200 to the trailer subsystem 108 with minimal operator input.

In many examples, the tractor 104 employs mechanical power from the engine 122 to produce fluid (e.g., hydraulic) pressure to operate the trailer subsystem 108. In some examples, a rotating output shaft from the engine 122 transfers rotational power to a vehicle transmission 202. While many tractors 104 include the vehicle transmission 202 to provide several forward drive gearing ratios and a reverse gear for a drive train of the tractor 104, there are some examples that may not include a transmission between the engine 122 and the PTO 138. As such, the transmission 202 is represented in dashed lines. Regardless of whether the transmission 202 is located operationally between the engine 122 and the PTO 138, mechanical power is transferred from the engine 122 to the PTO 138.

Remaining with FIG. 2, the PTO 138 can include an input shaft 204. At least one of the engine 122 or the vehicle transmission 202 control the input shaft 204 rotational speed. In turn, the PTO 138 is configured to receive mechanical power as the rotational speed of the input shaft 204. The PTO 138 can modify the revolution speed and the transmitted mechanical power using through-shafts, gears, and any other suitable power transmission components. The PTO 138 can also include an output shaft 206 to transmit rotational mechanical power via rotational speed of the output shaft 206 to a hydraulic pump 208.

As a component of a fluid power system of the tractor 104, the hydraulic pump 208 pressurizes hydraulic fluid taken from a hydraulic fluid sump 210 onboard the tractor 104. The hydraulic fluid can then be supplied to the trailer 106 through the fluid pressure supply line 200 to operate one or more hydraulic cylinders and/or actuators of the trailer subsystems 108 through suitable hydraulic lines and fittings represented in FIGS. 2-5. For example, the hydraulic pump 208 can provide pressurized hydraulic fluid at an actual pressure to the hydraulic cylinder 128 of trailer 106 as shown in FIG. 1. The hydraulic cylinder 128 and the dump mechanisms may constitute the trailer subsystem 108.

Figure 4:
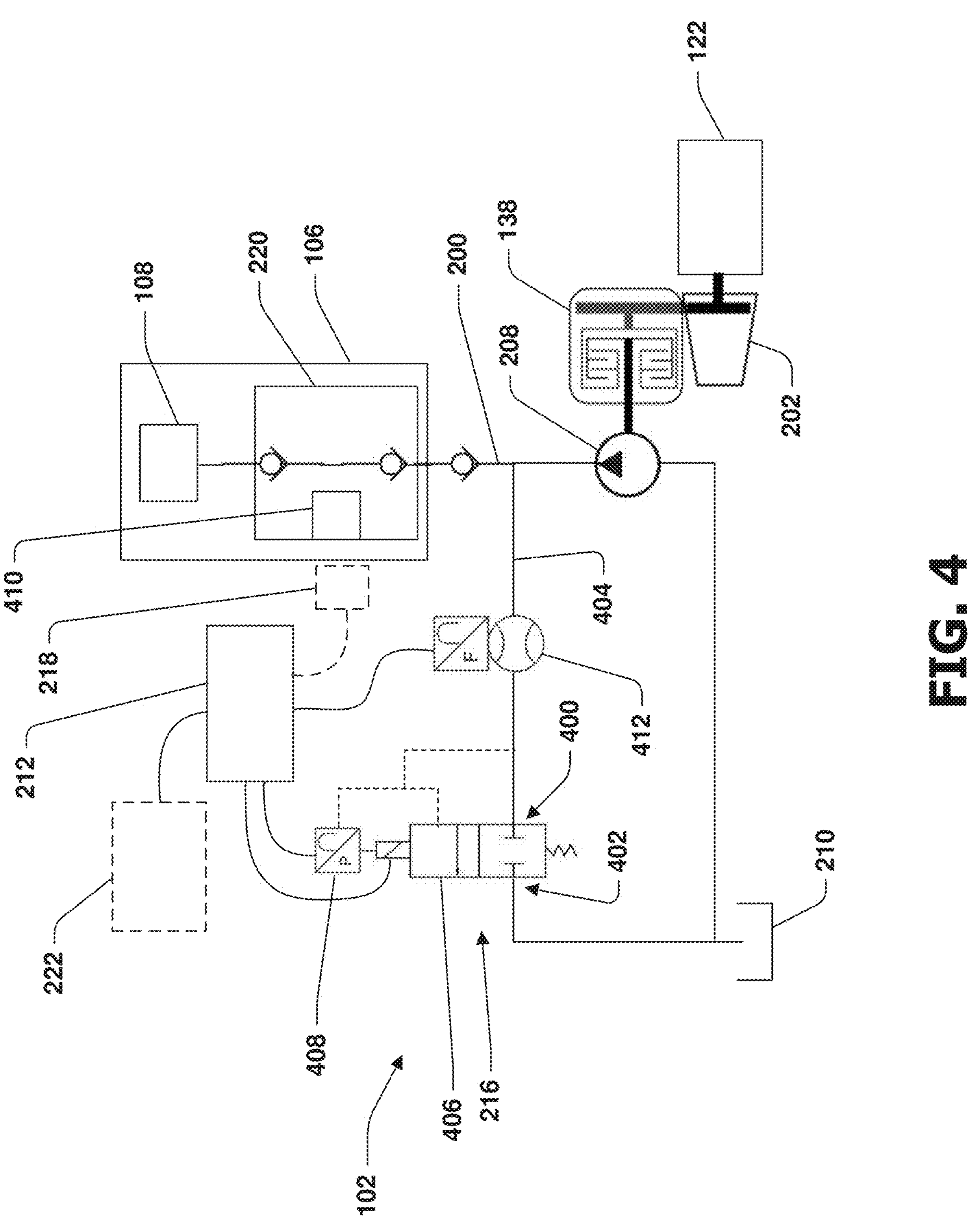
FIG. 4 is a hydraulic schematic of the proportional relief manifold system of FIG. 2.
Figure 6:
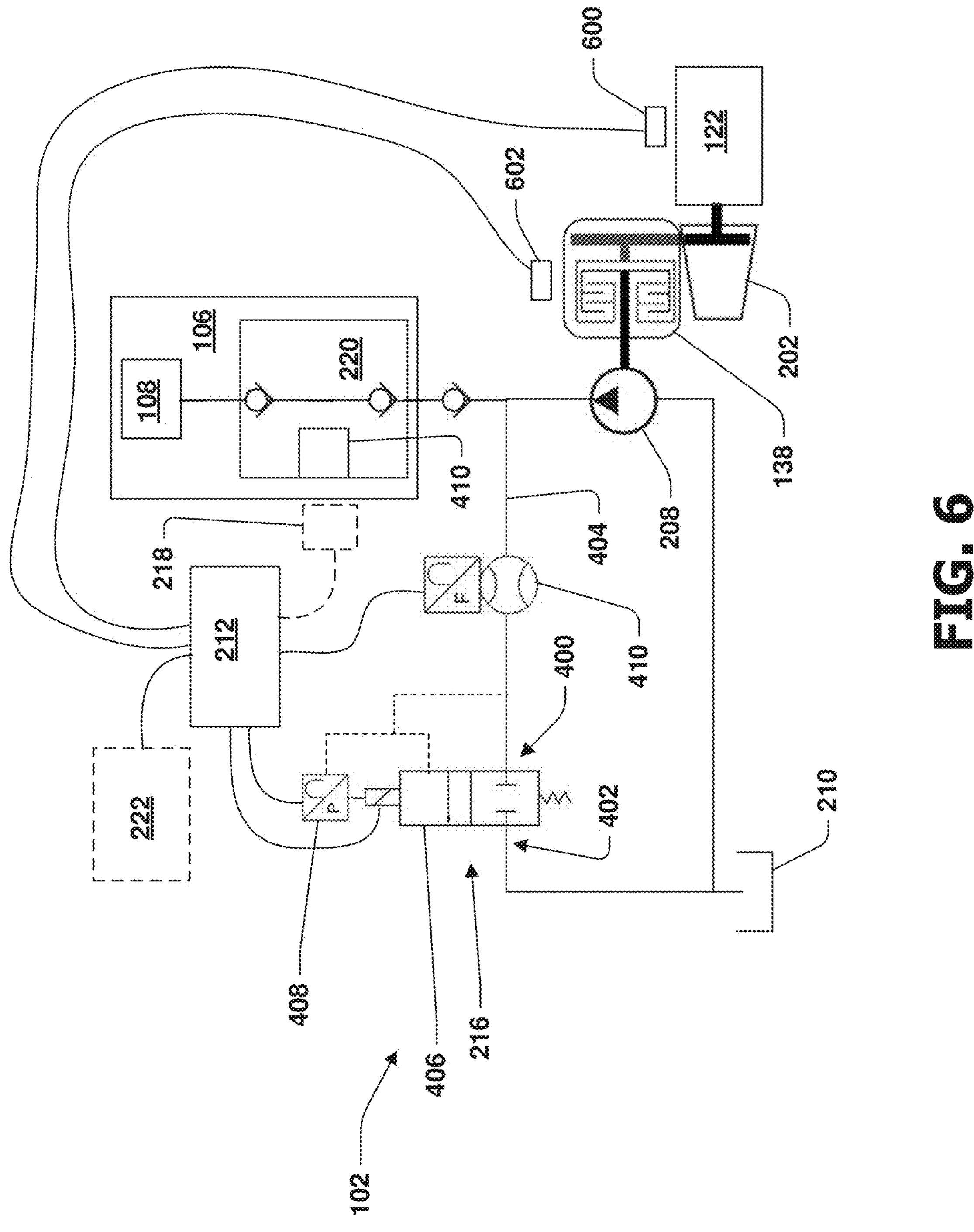
FIG. 6 is a hydraulic schematic of an exemplary electronic control system for the power take-off device of the tractor trailer of FIG. 1.
Figure 8:
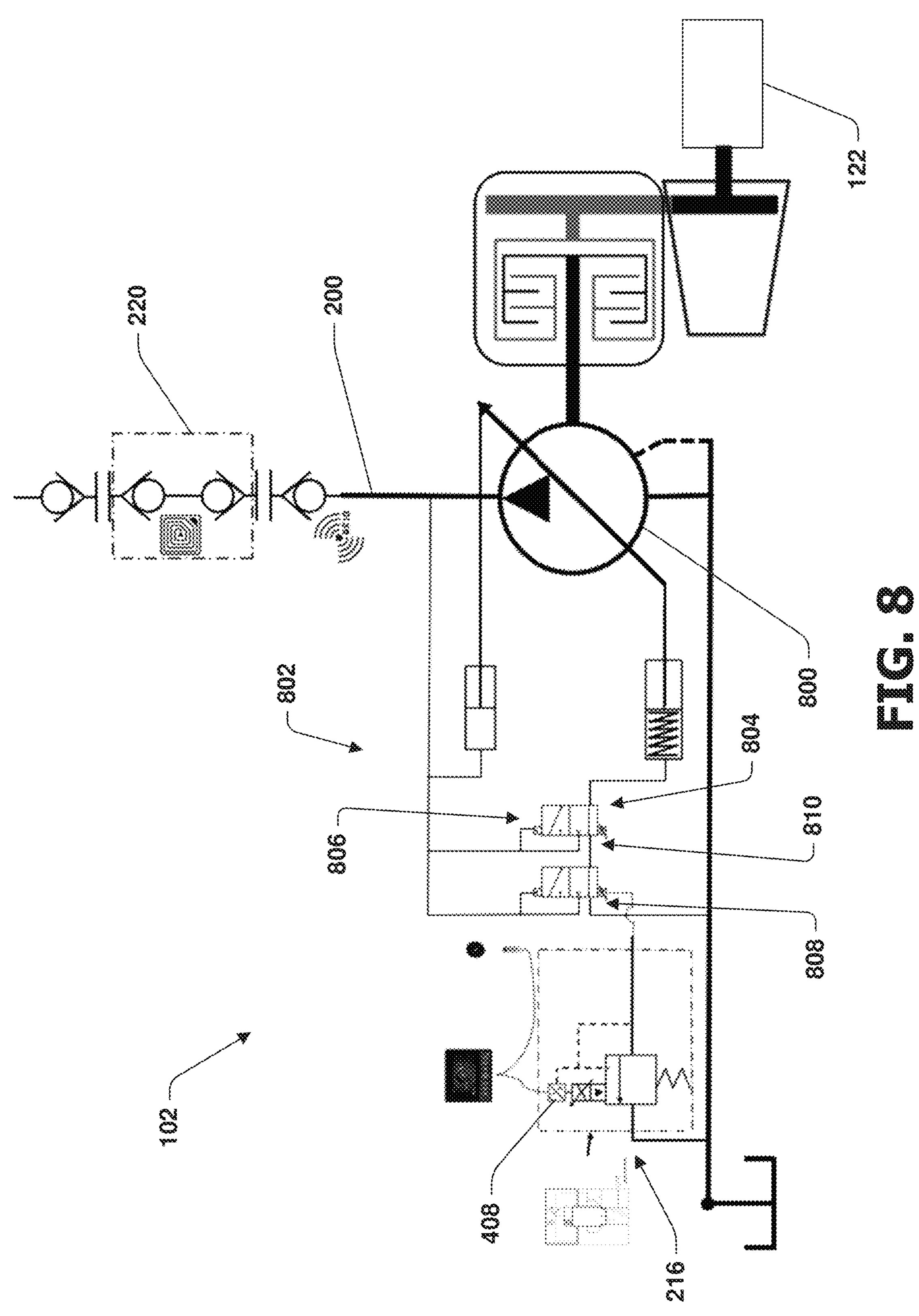
FIG. 8 is a hydraulic schematic of a proportional relief manifold system including a variable-volume pump and a pump compensator.

Referring to FIG. 8, in certain applications, an engine speed (e.g., an operating rpm) of the tractor engine 122 is fixed by emission-control logic, cruise-control requirements, or regulatory idle limits. When the engine speed cannot be varied, the constant-displacement hydraulic pump 208 as shown in FIGS. 4 and 6 may deliver more fluid flow (e.g., gallons per minute) and consume more horsepower than the trailer subsystem 108 requires. To accommodate those situations, the proportional-relief manifold system 102 can alternatively employ a variable-volume pump 800 (e.g., a pressure-compensated axial-piston pump) in place of, or in parallel with, the fixed-displacement pump 208.

An output flow of the variable-volume pump 800 is adjusted by a pump compensator 802 that reacts to a control-pressure signal applied to either a remote-compensator port 804 or a load-sense port 806, depending on the pump's control configuration. In some examples, by modulating the control-pressure signal, the pump compensator 800 may vary a pump swash plate angle to reduce or increase a displacement per revolution while maintaining a commanded or desired outlet fluid pressure.

It may be detrimental to unload a variable-volume pump 800 such as a variable-volume piston pump to zero pressure in the same manner as a constant-volume gear pump such as pump 208. If an outlet pressure falls below a minimum threshold, the pistons can lift off their shoes, leading to rapid wear. Accordingly, the controller 212 may maintain a minimum outlet pressure (e.g., 200 psi) whenever the variable-volume pump 800 is selected. The threshold value can be stored in memory 504 and retrieved as part of the equipment-data table.

The proportional-relief solenoid valve 216 (or an equivalent proportional valve) is in fluid communication with port 808 or port 810 to regulate the compensator control pressure. The same control loop shown in FIG. 5 may be used: the controller 212 receives the desired fluid pressure, compares it with the actual fluid pressure from the transducer 408, and outputs a voltage or current signal to valve 216. Control software may accommodate the pump type by referencing a stored pump-type flag; if the flag indicates a variable-volume pump 800, the algorithm may limit the minimum control-pressure command and adjust proportional-integral-derivative gains for the slower dynamic response of the pump compensator 802.

Returning to FIG. 2, the proportional relief manifold system 102 will be described generally with a more specific example described below. The proportional relief manifold system 102 modulates or controls aspects of the fluid power transmitted to the trailer 106 from the hydraulic pump 208. In some examples, the proportional relief manifold system 102 modulates the pressure of hydraulic fluid transmitted to the trailer 106. As previously discussed, any given tractor 104 may be tasked with driving and/or operating a number of different trailers 106, each potentially having a different trailer subsystem 108 than any other trailer 106. As such, the PTO 138 and hydraulic pump 208 may be tasked with producing and transmitting fluid pressure through a relatively wide range of potential fluid pressures for optimal performance of any number of trailer subsystems 108.

The proportional relief manifold system 102 can beneficially modulate the actual pressure of the hydraulic fluid to operate various trailer subsystems 108 more efficiently with less required operator input. The proportional relief manifold system 102 includes a controller 212 having controller circuitry that is configured to receive a desired fluid pressure that represents a desired or optimal pressure at which the trailer subsystem 108 typically operates. In general, the controller 212 and the controller circuitry within the controller 212 is in electrical communication with an operation sensor 214 and a valve 216. The valve 216 is in fluid communication with the hydraulic pump 208 as shown in FIG. 2, and the valve 216 can be a pressure relief valve used to control the actual fluid pressure within the fluid pressure supply line 200 based upon the desired fluid pressure stored in the controller circuitry. This process will be described below in greater detail.

The controller circuitry can be configured to receive the desired fluid pressure through a number of different inputs. For example, the controller circuitry can receive the desired fluid pressure from a sensor 218 that is electrically connected to the controller 212. For example, the sensor 218 can be a radio frequency identification (RFID) reader that can read an RFID tag located on the trailer 106. The RFID tag can be located on a portion of the trailer 106, on a hydraulic transition block 220 mounted to the trailer 106, etc. In some examples, the sensor 218 can be mounted to a portion of the tractor 104 such that the sensor 218 is in close proximity to the trailer 106 when the trailer 106 is connected to the tractor 104.

In some examples, the sensor 218 is configured to sense or read information located on tags or indicators other than RFID tags such as bar codes, quick response (QR) codes, or other indicia. The information can be the desired fluid pressure, a trailer identification, a brand or a model number of power fluid-operated equipment of the trailer subsystem 108, etc. The controller circuitry can store this information (e.g., store the desired fluid pressure) or compare the information to a data set in memory (e.g., match the information to an assigned desired fluid pressure). In some examples, the sensor 218 can be electrically connected to the controller 212 through a physical, wired connection or through a wireless connection such as a Wi-Fi connection, a Bluetooth connection, a local area network (LAN) connection, a radio frequency (RF) connection, etc.

In some examples, the controller circuitry can receive the desired fluid pressure from a manual control device 222. An operator (e.g., a driver of the tractor trailer 100) can manually input the desired fluid pressure using any suitable methods and structures including, but not limited to, a dedicated hand-held device, a smart phone, or a dashboard control unit located within the cab 118.

In general, the controller 212 and the controller circuitry within the controller 212 is in electrical communication with an operation sensor 214 and a valve 216. The valve 216 is in fluid communication with the hydraulic pump 208 as shown in FIG. 2, and the valve 216 can be a proportional relief valve used to control the actual fluid pressure within the fluid pressure supply line 200 based upon the desired fluid pressure stored in the controller circuitry. This process will be described below in greater detail.

Figure 3:
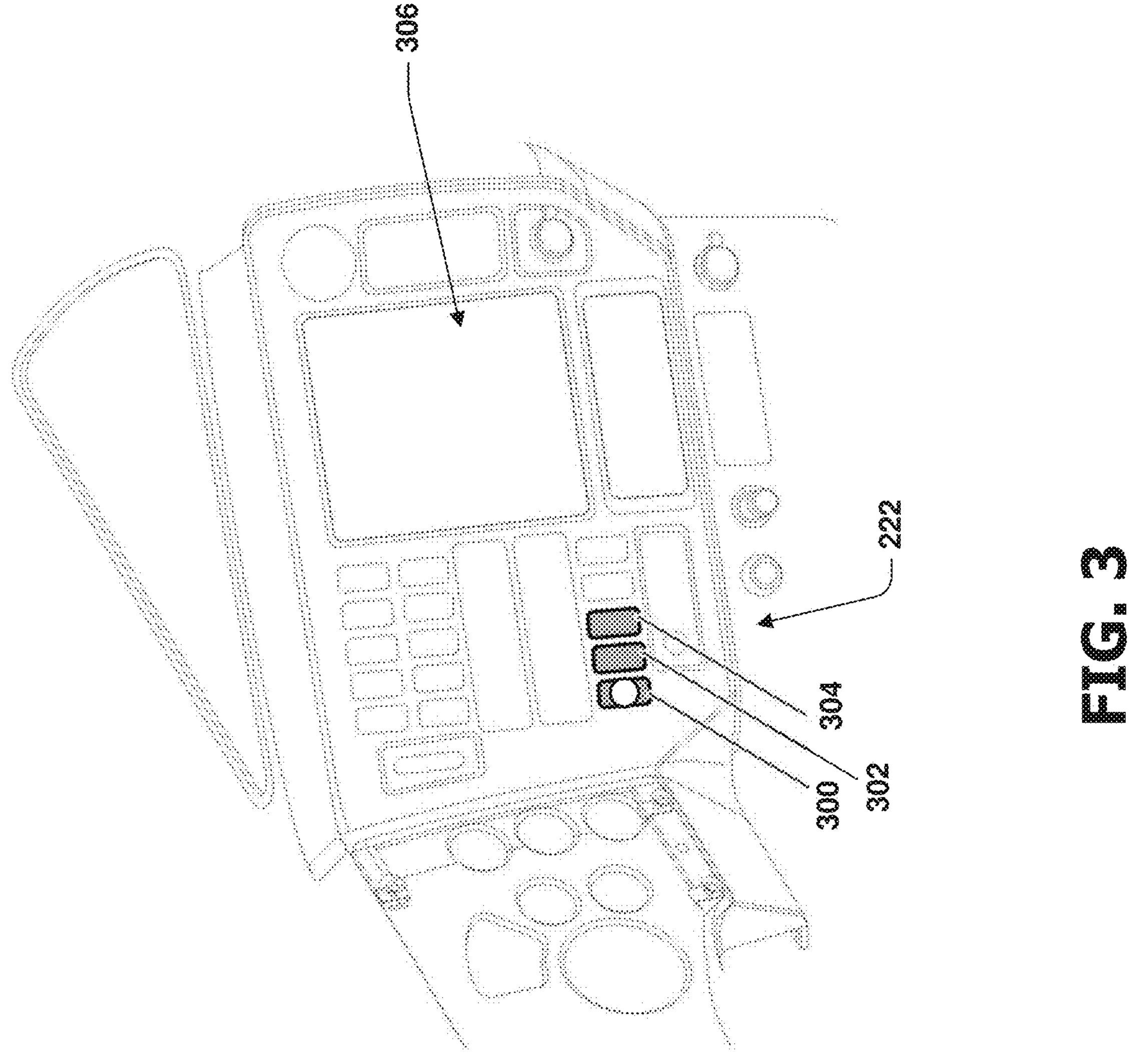
FIG. 3 is a perspective view of an exemplary dashboard environment of the tractor trailer of FIG. 1.

An example dashboard environment of the cab 118 is illustrated in FIG. 3, where the manual control device 222 can be controlled by an operator of the tractor trailer 100. From the cab 118, the operator can select or input information regarding the trailer subsystem 108 using the manual control device 222. In some examples, the information can include the desired fluid pressure to optimally operate the trailer subsystem 108. In some examples, the information can include identification of at least one of the trailer 106 or the trailer subsystem 108. The manual control device 222 can include a potentiometer 300, however, any suitable manual control device can be used. The potentiometer 300 can enable the operator to set the desired fluid pressure to an infinite number of values between a low limit value and a high limit value, for example, between 0 psi and 1,000 psi. As such, the manual control device 222 can be used to selectively set the desired fluid pressure to zero, meaning the tractor 104 does not transfer hydraulic power to the trailer 106. In this way, the operator can manually control the hydraulic power provided to one or more trailer subsystems 108 "on demand" rather than continuously.

Additional manual control devices 302, 304 can be included for control of additional performance aspects of hydraulic power system control, however these additional manual control devices 302, 304 are also not required. In some examples, the manual control device 222 can also include a display and/or a touchscreen device 306 enabling the operator to receive and control various aspects of the described hydraulic power system.

Referring to FIG. 4, a hydraulic schematic of the proportional relief manifold system 102 of FIG. 2 is illustrated. As previously discussed, the proportional relief manifold system 102 enables the operator to control the actual fluid pressure within the fluid pressure supply line 200. With this control, the fluid power developed by the PTO 138 can be controlled to match fluid pressure operating requirements of various trailers 106 and various trailer subsystems 108.

The proportional relief manifold system 102 includes the proportional relief valve 216 which can be a proportional relief solenoid valve 216. The proportional relief solenoid valve 216 defines defining an inlet port 400 and an outlet port 402 in fluid communication with a fluid power line 404. The fluid power line 404 is further in fluid communication with the fluid pressure supply line 200 located on an outlet side of the hydraulic pump 208. The proportional relief solenoid valve 216 also includes a spool 406. The spool 406 is located between the inlet port 400 which is on an upstream side of the spool 406 and the outlet port 402 which is located on a downstream side of the spool 406. As shown in FIG. 4, the spool 406 is normally closed, during which the full fluid pressure (less friction losses) developed by the hydraulic pump 208 is transmitted to the trailer subsystem 108.

A pressure transducer 408 is mechanically coupled to the proportional relief solenoid valve 216. The pressure transducer 408 is configured to measure an actual fluid pressure on the upstream side of the spool 406. The controller circuitry of the controller 212 is in electrical communication with the pressure transducer 408 and with the proportional relief solenoid valve 216. The controller circuitry is configured to receive the desired fluid pressure for the fluid pressure needs of the particular trailer subsystem 108 of the trailer 106 that is connected to the tractor 104 at the given time. As discussed previously, the desired fluid pressure can be input from the sensor 218, the manual control device 222, etc. As shown in FIG. 4, the sensor 218 can be located relatively close to an indicia or a code such as an RFID tag 410 located on the transition block 220 of the trailer 106.

In some examples, the sensor 218 is an indicia reader and is in electrical communication with the controller circuitry of the controller 212. The indicia reader can be configured to receive and provide to the controller circuitry an amount of equipment data associated with a unit of equipment (e.g., the trailer subsystem 108). As previously described, the trailer subsystem 108 is selectively connected to the fluid power line 404 and the fluid pressure supply line 200 of the tractor 104. While the description has thus far included indicia such as RFID tags, bar codes, etc., the equipment data such as the desired fluid pressure to optimally operate the unit of equipment can be associated with more simple indicia such as a color, a shape, or a number. The controller circuitry can be programmed to include desired fluid pressures associated with each indicia input from the sensor 218. In some examples, other methods of inputting the equipment data such as via unique connector pin arrangements for each trailer subsystem 108 can be used.

The controller circuitry is configured to receive from the pressure transducer 408 the measured actual fluid pressure within the fluid power line 404. During operation of the hydraulic pump 208. The controller circuitry is also configured to determine a pressure difference between the received actual fluid pressure and the received desired fluid pressure. In other words, if the actual fluid pressure within the fluid power line 404 is greater than the desired fluid pressure, the controller circuitry is configured to take action to limit the fluid pressure transmitted to the trailer 106 and the trailer subsystem 108 to more effectively and efficiently operate the trailer subsystem 108. In some examples, the hydraulic pump 208 located on the tractor 104 would not be selected or engineered to develop fluid pressure that is less than the desired fluid pressure for a wide range of trailer subsystems 108.

The controller circuitry is also configured to determine a pressure operating parameter based on the determined pressure difference between the received actual fluid pressure and the received desired fluid pressure. Any suitable pressure operating parameter is acceptable, including a voltage value output, an amperage value output, etc. The controller circuitry is further configured to modulate the actual fluid pressure by outputting the pressure operating parameter to the proportional relief solenoid valve 216, such that the proportional relief solenoid valve 216 modifies the actual fluid pressure of the fluid to match the desired fluid pressure.

In some examples, the controller circuitry outputs at least one of a voltage value output or an amperage value output to the proportional relief solenoid valve 216 to urge the spool 406 toward a fully open position or toward a fully closed position. Movement of the spool 406 will increase or decrease the fluid pressure within the fluid power supply line 200. In some examples, moving the spool 406 toward the fully open position will "bleed" an amount of hydraulic pressure within the fluid power supply line 200 as hydraulic fluid is permitted to pass through the spool 406 an return to the hydraulic fluid sump 210. It is to be understood that the spool 406 of the proportional relief solenoid valve 216 can be moved in relatively small, discreet distances such that the spool 406 can occupy a relatively large number of positions between the fully open position and the fully closed position. The various positions of the spool 406 enable the proportional relief solenoid valve 216 to approach or maintain the desired fluid pressure.

In some examples, the desired fluid pressure can be a particular value, for example, 100 psi. In some examples, the desired fluid pressure can be a range of +20% to −20% of a particular value such as 80 psi to 120 psi. In some examples, the desired fluid pressure can be a range of +10% to −10% of a particular value such as 90 psi to 110 psi. In some examples, the desired fluid pressure can be a range of +5% to −5% of a particular value such as 95 psi to 105 psi.

Figure 5:
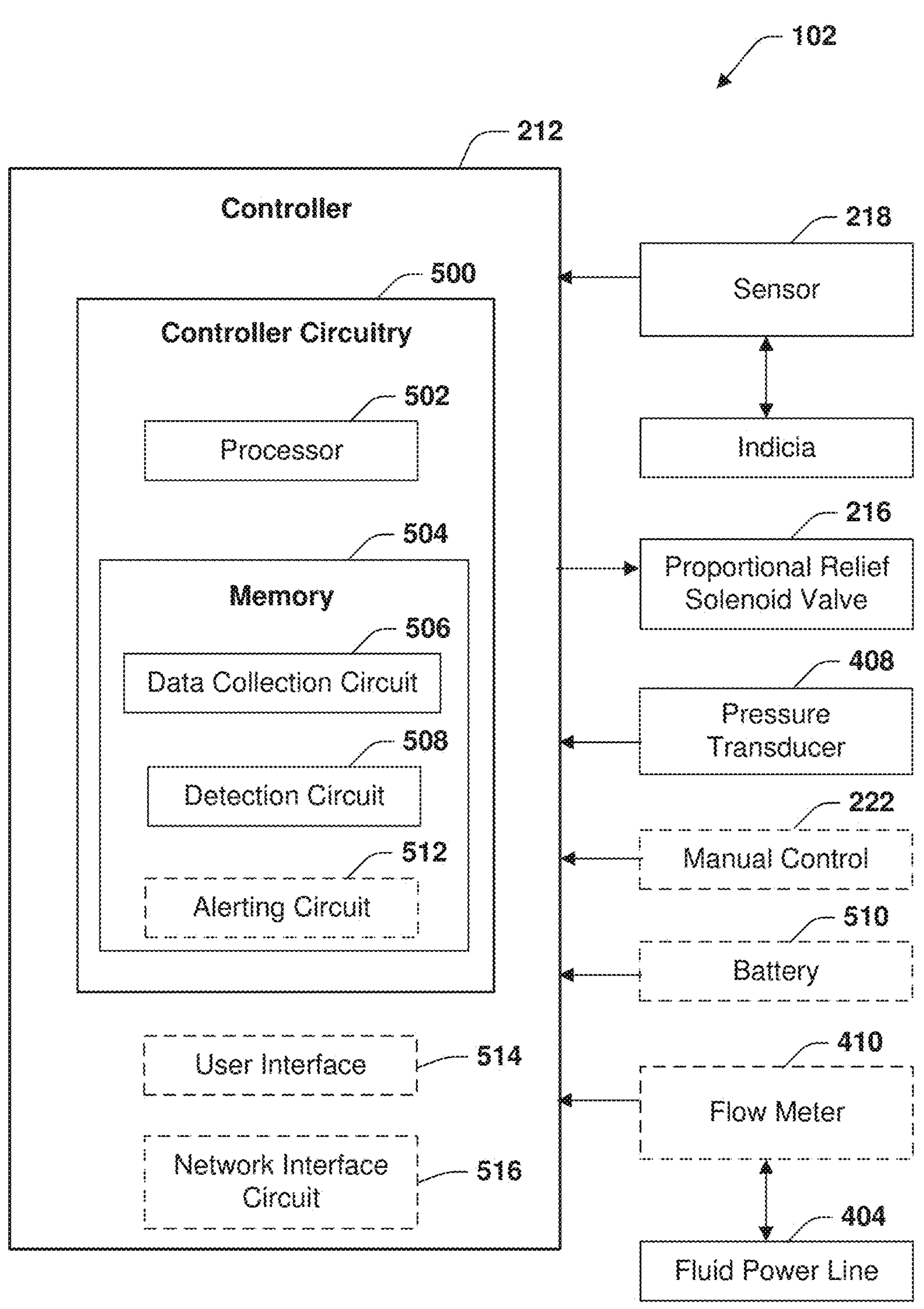
FIG. 5 is a schematic illustration of an exemplary controller circuitry of a controller of the proportional relief manifold system of FIG. 2.

Referring to FIG. 5, an exemplary controller circuitry 500 of the controller 212 is schematically illustrated. The proportional relief manifold system 102 and the controller circuitry 500 may be implemented and used by the tractor trailer 100. The proportional relief manifold system 102 includes a sensor 218 configured to detect and/or read equipment data regarding at least one of the trailer 106 or the trailer subsystem 108. As described previously, the controller circuitry 500 is in electrical communication with the sensor 218 such that the data detected and/or sensed by the sensor 218 is received by the controller circuitry 500 of the proportional relief manifold system 102.

The proportional relief manifold system 102 also includes the pressure transducer 408 configured to measure the actual fluid pressure on the upstream side of the spool 406. As described previously, the controller circuitry 500 is in electrical communication with the pressure transducer 408 such that the actual fluid pressure detected by the pressure transducer 408 is received by the controller circuitry 500 of the proportional relief manifold system 102.

The controller circuitry 500 is also in electrical communication with the proportional relief solenoid valve 216 such that the controller 212 can output the pressure operating parameter to the proportional relief solenoid valve 216 to control movement of the spool 406.

The controller circuitry 500 includes a processor 502 and a memory 504. The processor 502 is in electrical communication with the memory 504. The processor 502 can be a general purpose or specific purpose processor, a programmable logic controller (PLC), an application specific integrated circuit (ASIC), one or more field programmable gate arrays (FPGAs), a group of processing components, or other suitable processing components. The processor 502 is configured to execute computer code or instructions stored in the memory 504 or received from other computer readable media (e.g., a CD-ROM, a network storage device, a remote server, etc.).

The memory 504 can include one or more devices (e.g., memory units, memory devices, storage devices, etc.) for storing data and/or computer code for completing and/or facilitating the various processes described in the present disclosure. The memory 504 may include random access memory (RAM), read-only memory (ROM), hard drive storage, temporary storage, non-volatile memory, flash memory, optical memory, or any other suitable memory for storing software objects and/or computer instructions. The memory 504 may be communicably connected to the processor 502 via the controller circuitry 500 and may include computer code for executing (e.g., by the processor 502) one or more of the processes described herein.

The memory 504 can include a data collection circuit 506 configured to collect and store data. The data collection circuit 506 may be configured to store data representing the desired fluid pressure regarding various trailer subsystems 108. For example, the data collection circuit 506 can store a desired fluid pressure that equals or approaches an optimal fluid pressure or a range of fluid pressures that operate the vehicle subsystem 108 within a desired efficiency. Additionally, the data collection circuit 506 is configured to store pressure operating parameters that the controller 212 is able to output to the proportional relief solenoid valve 216 to modify the position of the spool 406. For example, the controller 212 can output a pressure operating parameter to the proportional relief solenoid valve 216 such that the controller 212 controls the actual fluid pressure within the fluid pressure line 404 and the fluid pressure supply line 200.

In some examples, though not necessary, the data collection circuit 506 can be configured to store threshold measurements for the pressure transducer 408. In certain embodiments, the threshold measurement may represent both an upper threshold measurement (i.e., the upper bound)

and a lower threshold measurement (i.e., a lower bound), such that a measurement taken by the pressure transducer 408 below the lower bound or above the upper bound may be indicative of a critical event requiring an alert or notification.

The memory 504 can include a detection circuit 508 that can be configured to receive a signal from the pressure transducer 408 and compare this data to the desired fluid pressure data stored by the data collection circuit 506. For example, the detection circuit 508 is configured to determine if an actual fluid pressure reading from the pressure transducer 408 differs from the desired fluid pressure stored in the data collection circuit 506 for the trailer subsystem 108 located on the trailer 106 attached to the tractor 104. For example, the detection circuit 508 may determine whether the actual fluid pressure is less than or greater than the desired fluid pressure.

As described, the controller 212 can be a PLC controller having two inputs and a single output. The two inputs can include an amount of equipment data representing the desired fluid pressure of the trailer subsystem 108 and the actual fluid pressure representing the fluid pressure measured or detected in the fluid power line 404. The single output can include the pressure operational parameter that is output to the proportional relief solenoid valve 216.

Optionally, the controller circuitry 500 of the controller 212 can be in electrical communication with the flow meter 412 configured to detect a flow within the fluid power line 404. The flow meter 412 can be any suitable type of sensor capable of accurately determining flow within the fluid power line 404. By monitoring the flow of hydraulic fluid within the fluid power line 404, the proportional relief manifold system 102 gains additional data that enhances the control and responsiveness of the system.

In some examples of the proportional relief manifold system 102, the detection circuit 508 collects and stores data from both the sensor 218 and the pressure transducer 408. Utilizing data from both sensors, the processor 502 can determine, based upon a stored algorithm, an appropriate pressure operating parameter to output to the proportional relief solenoid valve 216. This may enable the system to maintain the desired fluid pressure more effectively.

With input from both sensors, the processor 502 can employ feedforward control strategies that use flow data to predict necessary adjustments, in addition to feedback control based on the difference between actual and desired fluid pressure. By considering the ratio of actual to desired fluid pressures, the processor 502 can determine the most efficient pressure operating parameter, improving the overall efficiency of the system. This efficiency reduces energy losses and minimizes wear on mechanical components.

Monitoring the flow meter 412 and the pressure transducer 408 also allows the proportional relief manifold system 102 to detect abnormal operating conditions, such as sudden drops in fluid power and/or fluid power leaks. In such cases, the controller circuitry 500 can initiate protective actions, such as disengaging the PTO 138 or moving the spool 406 to the fully open position to prevent damage to the PTO 138 or connected subsystems. This enhances the safety and reliability of the entire proportional relief manifold system 102.

Furthermore, the flow meter 412 can be used for diagnostic purposes. By comparing flow rates over time, the proportional relief manifold system 102 can detect inefficiencies or mechanical issues within the PTO 138 or other components. This data can be logged, stored, and analyzed to schedule maintenance or address potential problems before leading to a system failure, thereby enhancing the longevity and reliability of the proportional relief manifold system 102.

The stored algorithm within the processor 502 may include proportional-integral-derivative (PID) control logic or other advanced control strategies that utilize both actual and desired fluid pressures to determine the optimal pressure operating parameter for the proportional relief solenoid valve 216. For example, when the tractor 104 is disconnected from a first trailer to complete a different hauling task with newly connected second trailer 106, the trailer subsystem 108 might require provision of fluid power at a higher pressure. At least one input to the controller 500, such as the sensor 218, indicates the desired fluid pressure regarding the second trailer 106 and the trailer subsystem 108. The processor 502 determines the appropriate pressure operating parameter, sends the pressure operating parameter to the proportional relief solenoid valve 216, and modifies the actual fluid pressure of the fluid to match the desired fluid pressure.

While not required, the controller circuitry 500 of the controller 212 can be in electrical communication with additional features such as the manual control device 222 as described previously. The controller circuitry 500 can also be in electrical communication with a battery 510. The battery 510 can enable the controller 212 to operate independently of a main vehicle battery often associated with vehicles including internal combustion engines.

Additional optional features of the controller circuitry 500 can include an alerting circuit 512 configured to perform one or more operations in response to receiving an indication of a critical event or a critical operating condition. In some examples, the alerting circuit 512 can signal a user interface 514 to provide notification of the event or condition to the operator of the tractor trailer 100. Another optional component of the controller circuitry 500 can include a network interface circuit 516 configured to enable the controller 212 to exchange information over a network. The network interface circuit 516 can include programming logic that facilitates connection of the controller 212 to an available network.

Referring to FIG. 6, a hydraulic schematic of an exemplary electronic control system for the PTO 138 is illustrated. In the example shown, the proportional relief manifold system 102 includes electronic control features for system components other than the proportional relief valve 216. In some examples, the controller circuitry 500 is in electrical communication with an engine control device 600. The controller circuitry 500 is configured to determine an engine operating parameter (e.g., revolutions per minute of the engine) based upon the actual fluid pressure of the fluid within the fluid power line 404 and the fluid power supply line 200. The controller circuitry 500 is also configured to output the engine operating parameter to the engine control device 600 such that the engine control device 600 modifies an operating speed of the engine 122 to match the desired fluid pressure.

The engine control device 600 enables the controller circuitry 500 to provide direct control of the engine 122 in addition to or in place of operator inputs. In some examples, the engine control device 600 can control various aspects of the engine 122 performance including, but not limited to, fuel injection, ignition, idle speed control through an electronic throttle or an idle air control valve, or variable valve timing. For example, the engine control device 600 can maintain a particular operating rpm of the engine 122 while the operator is outside the cab. Maintaining the particular operating rpm of the engine 122 can maintain the desired fluid pressure transmitted to the trailer subsystem 108 to help ensure proper or optimal operation of the trailer subsystem 108.

The controller circuitry 500 can also be in electrical communication with the PTO 138 through a PTO control device 602. The controller circuitry 500 is configured to determine a power take-off operating parameter based upon the actual fluid pressure of the fluid. The controller circuitry can also be configured to output the power take-off operating parameter to the PTO control device 602 such that the PTO control device 602 modifies an operating condition of the PTO 138. For example, the power take-off operating parameter may be a voltage or amperage signal to the PTO control device 602 to engage or disengage the PTO 138.

Some examples of operation of the trailer subsystem 108 require the PTO 138 to be engaged when the transmission 202 is in gear. For example, the tractor trailer 100 may need to be in a forward driving gear to slowly move forward while the trailer subsystem 108 raises a dump bed to dump hauled material. As such, the controller circuitry 500 can output a power take-off operating parameter that engages the PTO 138 at lower driving gears and/or relatively low travel speeds. However, it may be undesirable to maintain engagement of the PTO 138 during the same bed dump operation at relatively high travel speeds. As such, the controller circuitry 500 can be configured to output a power take-off operating parameter that disengages the PTO 138 at higher driving gears and/or relatively high travel speeds. In these examples, the PTO control device 602 acts as a switch, however, other types of PTO control devices are also contemplated. Additionally, the presence of hydraulic fluid flow can be determined by the PTO control device 602 acting as a switch.

In some examples, the controller circuitry 500 can determine an engaged condition of the PTO 138 by monitoring the pressure transducer 408, the inline flow meter 412 or another type of flow measuring device. As previously discussed, a significant system leak or catastrophic component failure causing a large oil leak can be determined by the pressure transducer 408. The controller circuitry 500 can be configured to, upon detection of such a condition, output a power take-off operating parameter to disengage the PTO 138. After sensing a loss of flow or pressure outside normal operating parameters, the proportional relief valve 216 can be rapidly adjusted to a relatively low pressure or zero pressure (e.g., approaching atmospheric pressure). This rapid adjustment of the proportional relief valve 216 can occur prior to the controller circuitry 500 outputting a power take-off control parameter to disengage the PTO 138 from a powertrain of the tractor trailer 100. This combination of operations will help reduce or eliminate the wear damage caused by rapid decompression of the hydraulic fluid.

In some examples, the controller circuitry 500 can be configured to receive input from a fifth wheel engagement indication. In some examples the controller circuitry 500 can be configured to output a power take-off operating parameter to the PTO control device 602 to engage or disengage the PTO 138 based upon the fifth wheel engagement indication. This arrangement can enable the controller circuitry 500 to permit or forbid PTO 138 engagement and act as a fifth wheel "lock" for engagement of the PTO 138 as needed.

Figure 7:
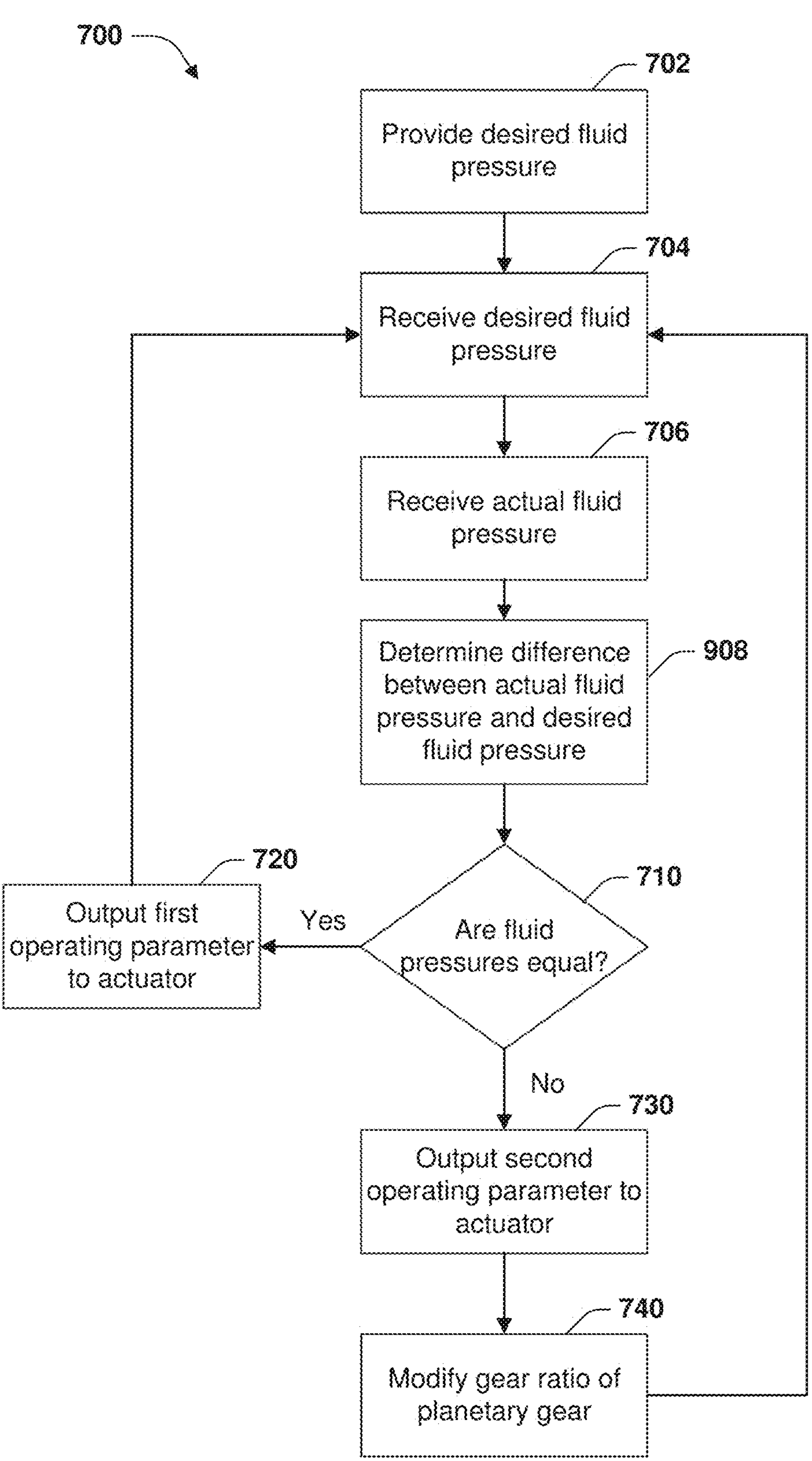
FIG. 7 is a flow diagram of an exemplary proportional relief control process.

Referring to FIG. 7, a flow diagram of an exemplary proportional relief manifold system 102 control process 700 is illustrated. For example, the control process 700 may be performed by the controller 212. The process 700 begins with process 702, providing a desired fluid pressure within a fluid power line 404. Often, process 702 will include reading an equipment identification with the sensor 218 or manually inputting the desired fluid pressure using the manual control device 222.

The controller circuitry 500 of the controller 212 receives the desired fluid pressure as a part of process 704, which may occur before or after process 702. The controller circuitry 500 can receive the desired fluid pressure by any suitable methods and structures. For example, the desired fluid pressure can be: data stored in the data collection circuit 506; a value manually input via an operator using the manual control device 222; a value read from the sensor 218; etc. In some examples, the desired fluid pressure may be predetermined based on modeling, testing, and/or prior performance of the trailer subsystem 108.

After the controller circuitry 500 of the controller 212 receives the desired fluid power, the controller 212 receives the actual fluid pressure from the pressure transducer 408 at process 706. For example, the pressure transducer 408 detects or reads the actual fluid pressure and outputs a signal to the controller circuitry 500 representing the actual fluid pressure.

Developing the actual fluid pressure often includes operating the engine 122, which may be an internal combustion engine. For example, an operator starts the engine 122 of the tractor 104 to accomplish required tasks of the tractor trailer 100, such as driving to various locations to haul loads. The engine 122 can provide mechanical power in the form of rotational speed of the power transmission components of the tractor 104. The PTO 138 can be attached to the transmission 202 components of the tractor 104 to power one or more trailer subsystems 108, from the existing power source (e.g., the engine 122).

When the controller circuitry 500 has received the actual fluid pressure, the detection circuit 508 may then compare the data from the pressure transducer 408 to the desired fluid pressure stored in the data collection circuit 506 as a part of process 708. The detection circuit 508 can determine a difference between the actual fluid pressure and the desired fluid pressure. As discussed previously, the desired fluid pressure can be a single value or a range of values that tends to keep the trailer subsystem 108 operating within desired performance characteristics.

If the detection circuit 508 determines there is no difference between the actual fluid pressure and the desired fluid pressure, the controller circuitry 500 can output a first operating parameter to the proportional relief solenoid valve 216 at process 720 as a result of the decision process 710. The proportional relief solenoid valve 216 is configured to receive the first operating parameter to maintain the spool 406 position to maintain the actual fluid pressure. Maintaining the actual fluid pressure continues to provide a relatively stable amount of fluid power to the trailer 106 and the trailer subsystem 108. As such, the actual fluid pressure continues to match (or relatively closely match) the desired fluid pressure.

If the detection circuit 508 determines there is a difference between the actual fluid pressure and the desired fluid pressure, the controller 212 can output a second operating parameter to the proportional relief solenoid valve 216 at process 730 as a result of the decision process 710. The proportional relief solenoid valve 216 is configured to receive the second operating parameter causing a movement of the position of the spool 406 as a part of the process 740. Modifying the position of the spool 406 modifies actual fluid pressure within the fluid power line 404 as more or less hydraulic fluid is passed to the tank or sump 210. As such, the actual fluid pressure increases or decreases (as appropriate) toward the desired fluid pressure.

Regardless of the result at the decision process 710, the path of the process 700 returns to the process 704 to receive the desired fluid pressure. In some examples, the desired fluid pressure will not have changed from the previous process cycle. In some examples, the desired fluid pressure will have changed through one of the previously described methods through which the controller circuitry 500 receives the desired fluid pressure. For example, the trailer 106 may have been replaced by another trailer with a different type of trailer subsystem 108.

The process 700 return paths from the processes 710 and 730 to the process 704 can form a closed loop feedback process. In some examples, the closed loop feedback process to control the actual fluid pressure does not require detection of other system characteristics such as the rotational speed of the PTO 138, the amount of flow of hydraulic fluid measured by flow meter 412, etc. In some examples, the sole input to the controller circuitry 500 is the actual fluid pressure as detected by the pressure transducer 408.

The controller circuitry 500 of the controller 212 (e.g., a PLC) compares the desired fluid pressure to the actual fluid pressure. Based upon the comparison, the controller circuitry 500 outputs an operating parameter to the proportional relief solenoid valve 216 to control the location of the spool 406 to maintain or modify the actual fluid pressure at or toward the desired fluid pressure.

The controller circuitry 500 may use any suitable algorithm or logic to determine the appropriate operating parameter to output to the proportional relief solenoid valve 216. For example, the controller circuitry 500 could implement a proportional control strategy. In proportional control, the operating parameter is adjusted in direct proportion to the error between the desired fluid pressure and the actual fluid pressure. The controller calculates this error and applies a correction factor proportional to the magnitude of the error, allowing for straightforward implementation and adequate performance in systems with relatively constant dynamics.

Alternatively, the controller circuitry 500 may employ a proportional-integral-derivative (PID) control algorithm that considers not only the current error but also the accumulation of past errors and the prediction of future errors. The PID control algorithm continuously calculates an error value as the difference between the desired output and the measured output. It then computes the control signal (operating parameter) by combining three components: the proportional term (P), which produces an output proportional to the current error; the integral term (I), which accounts for the accumulation of past errors by integrating the error over time and helps eliminate residual steady-state errors; and the derivative term (D), which predicts future errors by considering the rate of change of the error, improving the system's stability and response by dampening oscillations and reducing overshoot.

By tuning the gains associated with each term—the proportional gain, integral gain, and derivative gain—the controller can be optimized to achieve the desired system performance, balancing responsiveness and stability. Implementing a PID controller allows the proportional relief manifold system 102 to maintain the desired fluid pressure more precisely, even in the face of disturbances or varying load conditions.

Other relevant control strategies may also be utilized by the controller circuitry 500. For instance, adaptive control algorithms can adjust control parameters in real-time based on changes in system dynamics or operating conditions. This approach is particularly useful in systems where parameters may vary significantly over time or under different loads. Feedforward control can be incorporated to anticipate disturbances or changes in the actual fluid pressure by using a mathematical model of the system. By predicting the necessary adjustments in advance, feedforward control enhances the system's ability to maintain the desired fluid pressure with minimal delay.

Moreover, the controller circuitry 500 may implement model predictive control (MPC), which uses an internal model of the system to predict future behavior over a specified time horizon. MPC optimizes the control inputs by solving an optimization problem at each control interval, considering both current and future system states while respecting constraints. This method can handle multi-variable control problems and accommodate system constraints more effectively than traditional control strategies.

The choice of control algorithm depends on various factors, including the complexity of the proportional relief manifold system 102, the computational resources available, and the specific performance requirements of the trailer subsystems 108 powered by the PTO 138. Implementing advanced control strategies like PID control or MPC can enhance the performance of the PTO system by providing faster response times, reducing steady-state errors, and improving robustness against disturbances and parameter variations.

By utilizing suitable algorithms and control logic, the controller circuitry 500 helps ensure that the proportional relief solenoid valve 216 adjusts the position of the spool 406 appropriately to maintain the desired fluid pressure. This precise control may improve operation of connected subsystems, such as hydraulic pumps, which often require consistent rotational speeds for efficient performance. Consequently, the proportional relief manifold system 102 may enhance the overall efficiency, reliability, and safety of the tractor trailer's operations, contributing to reduced fuel consumption, lower maintenance costs, and improved longevity of mechanical components.

The presently disclosed structures and methods of operating a proportional relief manifold system can provide several benefits. For example, the proportional relief manifold system can help provide a constant or relatively constant fluid pressure despite rpm changes of the tractor engine typically experienced during regular operation of the tractor trailer.

As an operator connects or mates a trailer to a tractor, the connection can require the operator to connect one or more hydraulic lines from the tractor to the trailer. This is usually done via quick disconnect hydraulic couplers. However, each trailer and trailer subsystem can require different operating pressures when compared to any other trailer and trailer subsystem. Operators oftentimes will not adjust a system relief valve and rely upon the engine rpm to adjust pump flow requirements. The described system can provide automated changes of the tractor fluid power system operation to accommodate each trailer and trailer subsystem while requiring minimal operator action.

When the operator fails to make appropriate changes to the system relief valve or other system safeguards, less desirable effects can result. For example, an actual fluid pressure that is too high for the requirements of the trailer subsystem can damage the trailer and the trailer subsystem causing dangerous operating conditions. Conversely, a low actual fluid pressure can cause the trailer and/or the trailer subsystem to operate improperly and cause loss of production. Additionally, a relatively high fluid flow volume will create unnecessary energy to heat conversion and waste fuel and increase operating costs.

The described proportional relief manifold system can allow the PTO to be disengaged by sensing a loss of flow or pressure outside normal operating parameters. The proportional relief manifold system can also be rapidly adjusted to low pressure or zero pressure, prior to disengaging the PTO which can reduce or eliminate wear damage caused by rapid decompression of the hydraulic fluid. A fifth wheel lock indicator can supply additional feedback to the controller to forbid or permit PTO engagement.

A flow sensing device can be used to measure a specific flow range at a given rpm to determine if one or more hydraulic pumps are worn or nearing the end of its lifecycle. An automated message can be sent to create a maintenance task regarding the hydraulic pump or the entire system (e.g., maintenance or hydraulic pump replacement).

Although the apparatus and methods have been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

The invention claimed is:

1. A proportional relief manifold system for a power take-off device, comprising:

- a proportional relief solenoid valve including a spool and defining an inlet port and an outlet port, wherein:
  - both the inlet port and the outlet port are configured to be in fluid communication with a fluid power line;
  - the inlet port is located on an upstream side of the spool; and
  - the outlet port is located on a downstream side of the spool;
- a pressure transducer mechanically coupled to the proportional relief solenoid valve and configured to measure an actual fluid pressure on the upstream side of the spool; and
- controller circuitry in electrical communication with the pressure transducer and the proportional relief solenoid valve, wherein the controller circuitry is configured to:
  - receive a desired fluid pressure;
  - receive from the pressure transducer the measured actual fluid pressure;
  - determine a pressure difference between the received actual fluid pressure and the received desired fluid pressure,
  - determine a pressure operating parameter based on the determined pressure difference; and
  - modulate the actual fluid pressure by outputting the pressure operating parameter to the proportional relief solenoid valve, such that the proportional relief solenoid valve modifies the actual fluid pressure of the fluid to match the desired fluid pressure.

2. The proportional relief manifold system of claim 1, further comprising a radio frequency identification (RFID) reader in electrical communication with the controller circuitry, wherein:

- the RFID reader is configured to detect identification data associated with an RFID tag attached to a unit of equipment selectively connected to the fluid power line; and
- the controller circuitry is further configured to receive the detected identification data from the RFID reader and determine the desired fluid pressure based on the received identification data.

3. The proportional relief manifold system of claim 1, comprising an indicia reader in electrical communication with the controller circuitry, wherein:

- the indicia reader is configured to receive and provide to the controller circuitry equipment data associated with a unit of equipment selectively connected to the fluid power line; and
- the equipment data includes a desired fluid pressure to optimally operate the unit of equipment.

4. The proportional relief manifold system of claim 1, wherein the controller circuitry is a programmable logic controller including:

- a single input comprising the actual fluid pressure from the pressure transducer; and
- a single output comprising the pressure operating parameter.

5. The proportional relief manifold system of claim 1, including an interface device in electrical communication with the controller circuitry, wherein:

- the interface device is configured to receive a manual input including at least one of identification data or the desired fluid pressure of the manual input associated with a unit of equipment selectively attached to the fluid power line, and
- the controller circuitry configured to receive the manual input from the interface device.

6. The proportional relief manifold system of claim 1, wherein the controller circuitry includes a memory, the memory configured to store equipment data, the equipment data including a plurality of pressure operating parameters associated with a plurality of units of equipment operated by a fluid in the fluid power line.

7. The proportional relief manifold system of claim 1, wherein the controller circuitry is in electrical communication with an engine control device, the controller circuitry configured to:

- determine an engine operating parameter based upon the actual fluid pressure of a fluid in the fluid power line, and
- output the engine operating parameter to the engine control device such that the engine control device modifies an operating speed of an engine to match the desired fluid pressure.

8. The proportional relief manifold system of claim 1, wherein the controller circuitry is in electrical communication with the power take-off control device, the controller circuitry configured to:

- determine a power take-off operating parameter based upon the actual fluid pressure of a fluid in the fluid power line, and
- output the power take-off operating parameter to the power take-off control device such that the power take-off control device modifies an operating condition of the power take-off device.

9. The proportional relief manifold system of claim 8, wherein the controller circuitry is configured to output the pressure operating parameter to the proportional relief solenoid valve, such that the proportional relief solenoid valve modifies the actual fluid pressure of the fluid to decrease the actual fluid pressure to approach atmospheric pressure before a known output of the power take-off operating parameter to disengage the power take-off device from a powertrain of a vehicle.

10. An electronic control system for a power take-off system operating a unit of equipment located on a vehicle trailer, comprising:

an engine control device including at least one of an electronic control unit, an electronic throttle input, an electronic engine input, or an electro-mechanical device; and controller circuitry in electrical communication with the engine control device, the controller circuitry configured to:

receive a desired fluid pressure to operate the unit of equipment;

determine an engine operating parameter based on the desired fluid pressure; and output the engine operating parameter to the engine control device, such that the engine control device modifies an engine parameter to match the desired fluid pressure to operate the unit of equipment.

11. The electronic control system of claim 10, wherein the engine parameter is measured as revolutions per minute.

12. The electronic control system of claim 10, wherein the engine control device includes at least one of an engine control software package, an electronic throttle, an electro-mechanical device, or a mechanical engine input.

13. An electronic control system for a power take-off system operating a unit of equipment located on a vehicle trailer, comprising:

controller circuitry configured to receive a plurality of desired power take-off operating parameters associated with a plurality of units of equipment selectively operated by the fluid, the controller circuitry including:

a memory configured to store the plurality of desired power take-off operating parameters associated with the plurality of units of equipment, wherein:

the controller circuitry is configured to:

receive an equipment operating status from an operation sensor, compare the equipment operating status to a desired power take-off operating parameter of the plurality of desired power take-off operating parameters stored in the memory, determine a power take-off operating parameter based upon the comparison of the equipment operating status to the desired power take-off operating parameter, and output the power take-off operating parameter to a power take-off device, such that the power take-off device is at least one of engaged or disengaged by altering a connection of the power take-off device to a powertrain of a vehicle.

14. The electronic control system of claim 13, wherein:

the operation sensor is a switch, the equipment operating status is at least one of engagement or disengagement of the power take-off device with a powertrain of a vehicle, and the switch is configured to output the equipment operating status.

15. The electronic control system of claim 13, wherein:

the operation sensor is a switch, the equipment operating status is at least one of engagement or disengagement of the power take-off device with a powertrain of a vehicle, and the controller circuitry is configured to output the power take-off operating parameter to the power take-off device only after the controller circuitry receives an identification of the unit of equipment.

16. The electronic control system of claim 13, wherein:

the operation sensor is a pressure transducer mechanically coupled to the fluid power line, the equipment operating status is an actual fluid pressure, and the pressure transducer is configured to output the actual fluid pressure.

17. The electronic control system of claim 13, wherein:

the operation sensor is a flow meter mechanically coupled to the fluid power line, the equipment operating status is an actual fluid flow, and the flow meter is configured to output the actual fluid flow.

18. The electronic control system of claim 13, wherein:

the operation sensor is a fifth wheel lock indicator, the equipment operating status is at least one of a locked condition or an unlocked condition of a fifth wheel, and the fifth wheel lock indicator is configured to output a fifth wheel lock status indicator.

19. The electronic control system of claim 13, comprising a vehicle transmission sensor in electronic communication with the controller circuitry, the vehicle transmission configured to:

detect an operating gear condition of the vehicle transmission, and output the operating gear condition to the controller circuitry, wherein the controller circuitry is configured to:

compare the operating gear condition to the desired power take-off operating parameter of the plurality of desired power take-off operating parameters stored in the memory, and determine the power take-off operating parameter based upon the comparison of the operating gear condition to the desired power take-off operating parameter, and output the power take-off operating parameter to the power take-off device, such that the power take-off device is disengaged for selected values of the operating gear condition.

* * * * *